Dec. 7, 1937.  A. W. FRANZMEIER  2,101,811
FILTER PAD
Filed Dec. 28, 1935  2 Sheets-Sheet 1
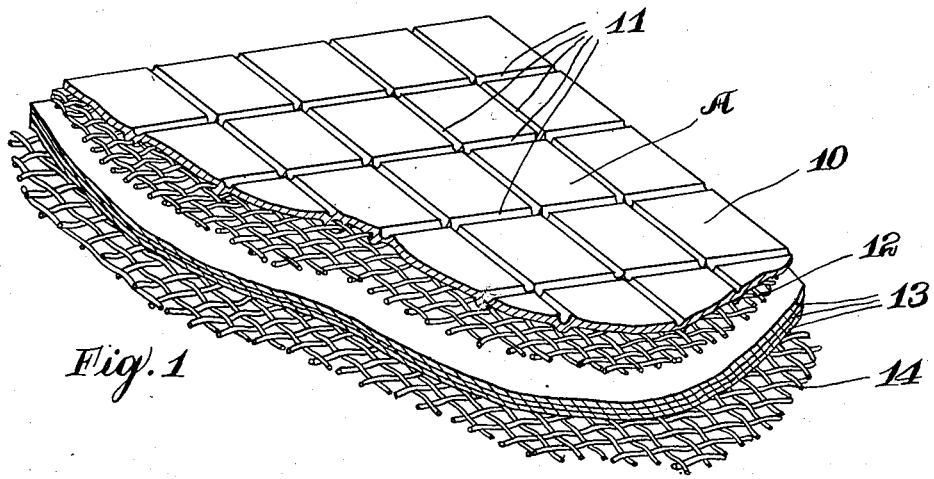
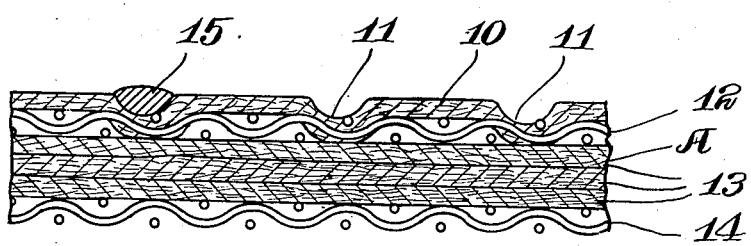
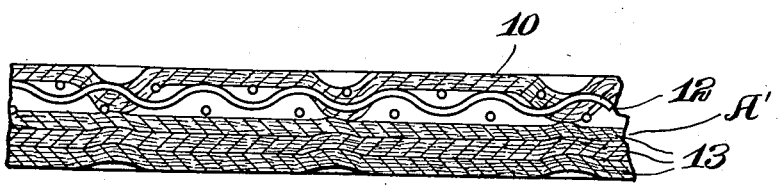
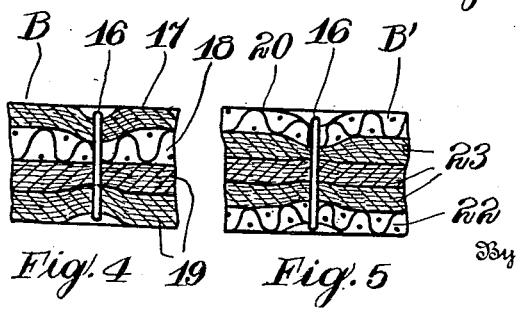
Inventor
Alvin W. Franzmeier
By Howard Pricher
Attorney

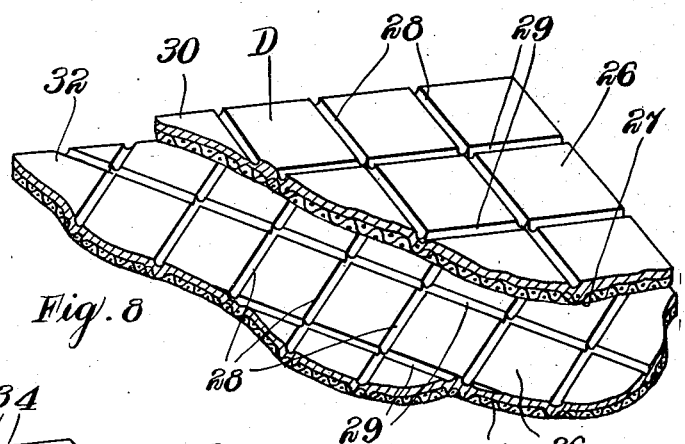
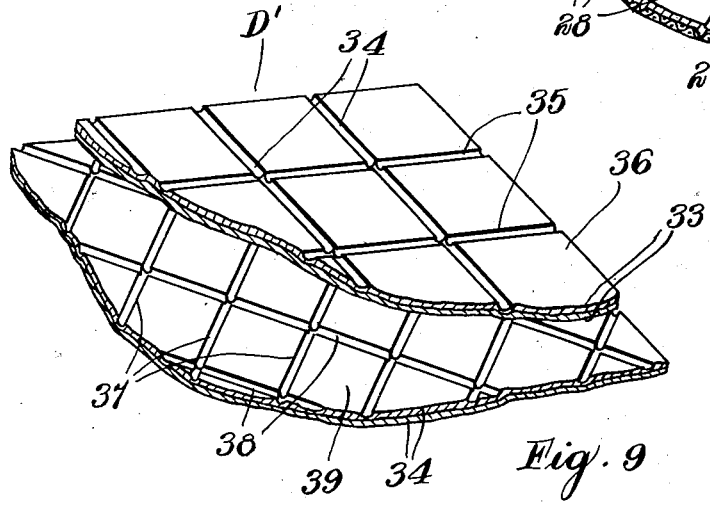

Patented Dec. 7, 1937

2,101,811

UNITED STATES PATENT OFFICE 2,101,811

FILTER PAD

Alvin W. Franzmeier, Rosemount, Minn.

Application December 28, 1935, Serial No. 56,509

6 Claims. (Cl. 210—169)

My invention relates to an improvement in filter pads. It is the primary purpose of this invention to provide a filter pad which will strain thoroughly and quickly, and which will not wash even when subjected to a considerable force of liquid tending to part the fibres or tissues forming the pad.

Attempts have been made for some time to provide a satisfactory pad which will strain faster than a cotton pad, and yet which will not wash as readily as will such a cotton pad. I have made extended experiments with material in the nature of soft absorbent paper. Unless a strainer is very carefully designed to avoid a strong flow of liquid in any one direction, however, such material will wash away in spots, permitting liquid not properly strained to flow therethrough. This material also, in some forms, has the property of swelling up somewhat, when moistened, spreading the fibres apart and making the pad less efficient as a straining element.

It is an object of my invention to take advantage of these properties which have previously seemed detrimental, and to form a pad which will be extremely effective, and which yet will strain more quickly than is ordinarily possible. This aim I accomplish by strengthening the material forming the pad by some means so that the washing tendency is overcome, and so that the lower portion of the pad is held firmly so that it may not swell sufficiently to allow foreign matter to pass through the filter pad. The top portion of the pad preferably is allowed to swell, so that this portion is especially capable of stopping the larger particles of foreign matter, allowing the smaller particles to pass through this portion to be stopped by the lower portion of the pad. I have found that, as a result, the liquid passes cleanly through the filter more quickly than is possible with the common type of pad.

It is also a feature of my invention to provide a means of stiffening the pad, so that it may be handled more readily, and so that it will require less support from the bottom when in straining position. By the use of this stiffening means, I have found it to be often practical to use the filter pad supported only along its edges, and entirely unsupported beneath its straining area. Such use is of course of great importance, for every type of supporting means beneath the strainer pad reduces the effective area of the pad, and slows the straining action.

I have further found that the use of a fibrous material such as loosely formed, absorbent paper, used in combination with a thin sheet of material such as cotton, is superior to a pad formed of cotton alone, in a thicker sheet, for if the material such as paper is combined as a layer above the cotton, it acts to strain out the larger particles before the liquid reaches the cotton. The liquid accordingly will pass through such a pad quickly, for the foreign matter is distributed more widely through the entire thickness of the pad, rather than in a single layer on the top of the pad.

It is my purpose to stiffen the filter pad by means of pressing the material to form a relatively stiff rib or series of ribs, or to provide a row of stitching for this purpose, or by pressing grooves in the paper which may be filled with a reinforcing material which will harden and hold the pad stiff. This reinforcing material could also be applied on the surface of the pad.

These and other objects and novel features of my invention will be more fully and clearly set forth in the accompanying specification and claims.

In the drawings forming a part of the specification:

Figure 1 is a perspective view of a portion of my pad, the various layers thereof being broken away so that the construction may be noted.

Figure 2 is a cross-sectional view of the pad shown in Figure 1.

Figure 3 is a cross-sectional view of a pad identical with that of Figure 2, except that no lower gauze reinforcing is provided.

Figure 4 is a cross-sectional view of a small portion of an alternative type of pad, showing stitching extending therethrough.

Figure 5 is a cross-sectional view of a type of pad construction similar to that shown in Figure 4, but having reinforcing gauze on the top and bottom thereof to better support the stitching extending therethrough.

Figure 6 illustrates a pad formed of fibrous material and gauze, before this material is pressed.

Figure 7 illustrates the pad of Figure 6, after pressing the material into the gauze, and after adding unpressed fibrous material on the top of the pressed portion.

Figure 8 is a perspective view of a portion of a pad made of two separately pressed portions superimposed.

Figure 9 is a view similar to that of Figure 8, in which the pad is not reinforced by gauze.

My pad A, as formed in Figures 1 and 2, is built up of an upper layer of fibrous material, such as soft paper of a type capable of absorbing water and of permitting liquid to pass therethrough while retaining foreign matter carried thereby. This upper layer 10 of fibrous material is preferably pressed into a layer of gauze so as to be partially embedded directly into the gauze. As shown, the upper layer 10 is pressed along narrow areas 11, forcing the fibrous material down into the gauze layer 12 to hold these materials closely united. The pressed areas are sufficiently close together to firmly hold the fibrous layer 10 to the gauze 12 when liquid is applied.

Beneath the gauze 12 are provided several layers 13 of fibrous material, which may be of the same nature as the upper layer 10. These layers 13 are further reinforced by a gauze layer 14 extending underneath the pad.

With this type of pad, it appears that the upper layer 10 swells up somewhat when the liquid to be strained is poured over the same. This spreads the fibres forming the layer farther apart, and allows some of the smaller particles of material to pass therethrough, through the gauze 12, to the lower layers 13.

The lower layers 13 are prevented from swelling to any great extent by the layer of gauze 12. The weight of the liquid being strained seems to urge the gauze down against the layers 13, preventing the layers 13 from swelling materially and preventing the fibres therein from spreading greatly. The layers 13 thus catch the smaller particles of foreign material in the liquid and thoroughly cleanse the material.

If desired, the material forming the layers 13 may be of fibres which pack together more readily than those of the layer 10. It is important, however, to avoid the use of materials which pack too tightly, to maintain the desired flow through the strainer pad.

In Figure 2 I illustrate filling material used for reinforcing purposes in the pressed portions of the pad. The filling material 15 is of such material as casein or other material which is flexible to a certain extent so that it will not crack in usage, and yet which will stiffen the pad sufficiently to make unnecessary the supporting of the pad from the bottom during the straining operation. Obviously, this material could be applied in strips over the surface of the pad, or over the surface of any of the layers of the pad, and need not be in the pressed portions of the pad as shown. The illustrated form, however, has the advantage of being more firmly held in place, and of presenting a virtually smooth upper surface to the pad, as well as the advantage of providing a strengthening rib extending down into the body of the pad.

The pad A' illustrated in Figure 3, is similar to that shown in Figures 1 and 2, without the layer of gauze on the bottom of the pad. It will be noted that in the illustrated forms, Figure 2 shows merely the top layer of material 10 pressed into the gauze 12 before the layers 13 are applied. The same procedure can be followed, however, by applying the layers 13 before the pressing operation, as shown in Figure 3, so that the layers 13 are pressed somewhat into the layer of gauze 12 as well as the layer 10.

In place of pressing the material along spaced lines as shown in Figure 1, 2, and 3, the pads B and B', shown in Figures 4 and 5 of the drawings, are stitched along parallel lines, by some such means as a gang sewing machine. This provides rows 16 of stitching extending through the entire pads B and B'. The pad B is comprised of an upper layer 17, a gauze layer 18, and lower layers 19 of straining material. The pad B', shown in Figure 5, is made up of two sheets of gauze, 20 and 22, between which are interposed layers 23 of straining material. These forms are illustrative of constructions suitable for the purpose. Obviously, other forms of constructions could be used without changing the invention.

Figures 6 and 7 show a slightly different construction, or a slightly modified form of pad. In this construction, two layers 24 of absorbent material, such as loosely formed absorbent paper are placed on a sheet of gauze 25, as shown in Figure 6, and then pressed over the entire surface. This acts to press the paper down into the gauze, making a substantially integral layer which is relatively stiff and which is sufficiently flexible to prevent cracking when bent. The pad is completed by adding unpressed layers of material 24' over the sheet thus formed, as shown in Figure 7. It may be seen that this construction is very similar to that shown in Figures 1, 2, and 3, but that the order of the elements is changed somewhat, and one of the straining layers, or more, is entirely pressed into the gauze layer. Care must be taken in forming this type of pad C to avoid pressing the straining material into the gauze so firmly that the straining action is seriously impeded.

The pad D, shown in Figure 8, comprises two units such as were shown in Figures 1 to 3, arranged so that the pressed or reinforced portions of the pad are at angles one with the other. For example, each unit of the pad D comprises a straining element portion 26 and a gauze layer 27 into which the layer 26 is pressed along parallel lines 28 and parallel lines 29, which intersect each other at right angles, or substantially so. The upper unit 30 however, has its lines 28 and 29, running parallel with the edges of the pad shown, while the lower unit 32 is shown with the pressed portions running diagonally. This provides added strength and thoroughly reinforces the pad D.

The pad D' shown in Figure 9 is similar to the pad D, but contains no gauze layers. The various layers 33 forming the pad are pressed in the manner described in connection with the pad D, the compressing of the material at these points acting to reinforce the pads. The lines 34 and 35 along which the upper unit 36 is pressed extend angularly with respect to the lines 37 and 38 along which the lower unit 39 is pressed, as shown in Figure 9.

I have found that pads made in accordance with my invention are sufficiently stiff to require little or no support beneath the same during the straining action. They are very quick in action, and permit a large quantity of liquid to be strained in a short period of time. Regardless of this fact, they are efficient and strain the liquid thoroughly. Furthermore, because of the fact that the upper portion of the pad usually acts to remove the larger impurities, and the intermediate portions serve to obstruct the smaller impurities, pads made in this manner can be used longer than pads which are more closely matted together on top and which form a layer of impurities quickly over the entire top surface.

In accordance with the patent statutes, I have described the principles of operation of my strainer pads, and while I have endeavored to set forth the best embodiments thereof, I desire to have it understood that this is only illustrative of a means of carrying out my invention, and that obvious changes could be made within the scope of the following claims without departing from the spirit of the invention.

I claim:

1. A strainer pad comprising a layer of gauze, and a layer of filtering material free from said gauze through the greater area thereof, said filtering material extending into said gauze at spaced intervals to reinforce the pad.

2. A strainer pad comprising, two integral units, each unit including a strip of gauze and a sheet of soft filtering material pressed into said gauze along parallel lines, the lines of one of said units crossing the lines of the other of said units in the complete pad.

3. A strainer pad comprising, two integral portions, each portion including a strip of gauze and a layer of soft filtering material pressed into said gauze along right angularly disposed lines, the lines of one of said units crossing the lines of the other of said units in said pad.

4. A strainer pad comprising a thickness of straining material of relatively low tensile strength, and a reinforcing means for said material, said reinforcing means comprising strips of flexible material of relatively higher tensile strength, said strips being adhered to a surface of said material.

5. A strainer pad comprising a thickness of straining material of relatively low tensile strength, and a reinforcing means for said material, said reinforcing means comprising strips of flexible adhesive material of relatively higher tensile strength adhered to a surface of said straining material.

6. A strainer pad comprising a thickness of straining material of relatively low tensile strength, and a reinforcing means for said material, said reinforcing means comprising strips of flexible adhesive material of relatively higher tensile strength adhered to, and partially embedded in, said straining material.

ALVIN W. FRANZMEIER.